Feb. 13, 1940.   J. B. CLERKE   2,190,327
DRAFTING ATTACHMENT FOR SCALES
Filed April 26, 1938
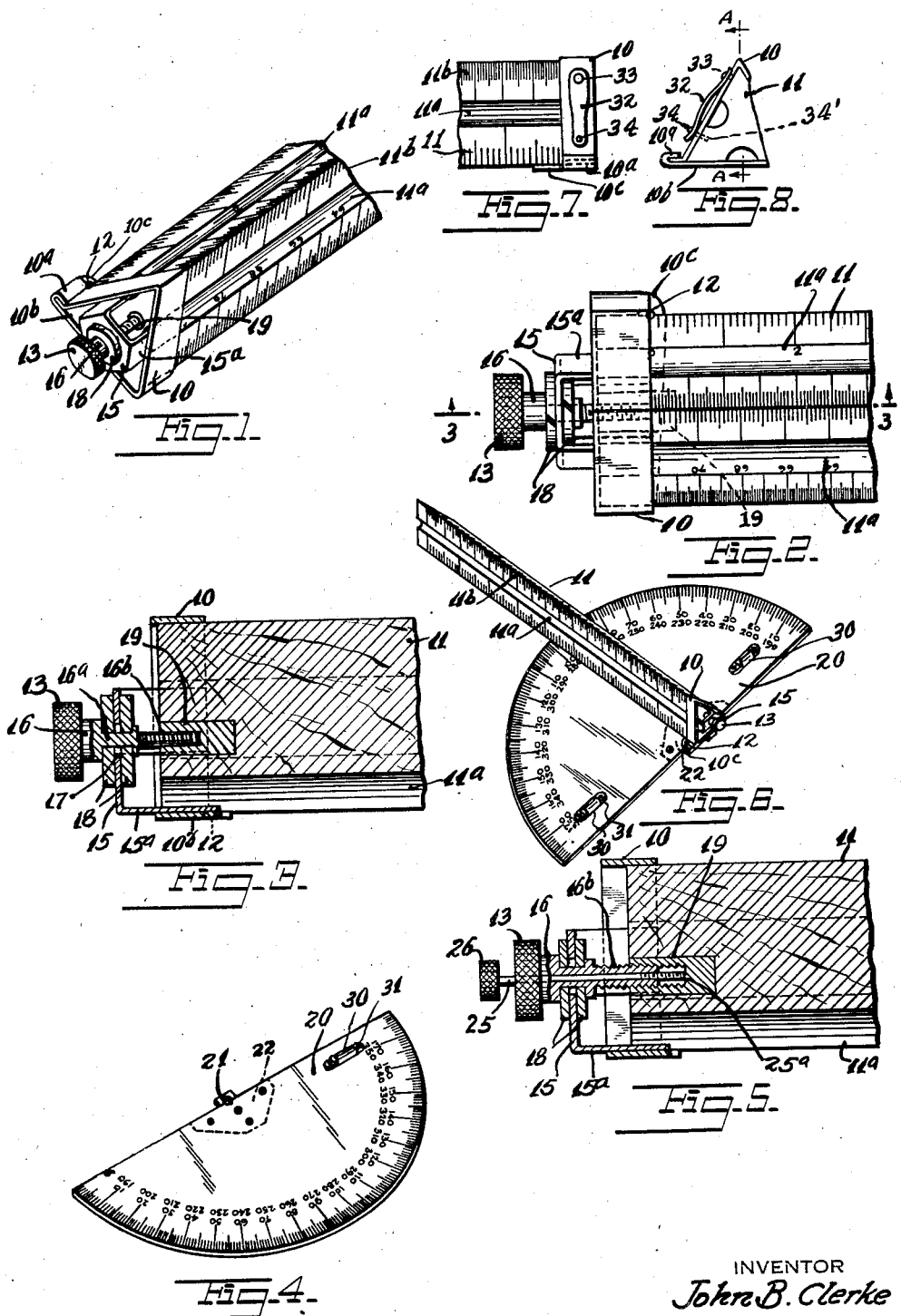
INVENTOR
John B. Clerke
BY
ATTORNEY Patented Feb. 13, 1940

2,190,327

UNITED STATES PATENT OFFICE 2,190,327

DRAFTING ATTACHMENT FOR SCALES

John B. Clerke, Springfield Gardens, N. Y.

Application April 26, 1938, Serial No. 204,303

9 Claims. (Cl. 33—75)

This invention relates to new and useful improvements in a drafting attachment for topographical and similar drawing.

The invention has for an object the construction of a drafting attachment to a triangular scale which permits the scale to be swung around the center of a protractor and various distances measured off without excessive precaution.

The invention contemplates constructing the attachment in a manner so that it may be turned around to different positions on the triangular scale so that different rulings on the scale may be used.

Still further the invention proposes the provision of vernier means associated with the device by which it may be properly adjusted to the zero position of any one of the rulings on the scale.

Still further the invention proposes an arrangement by which the attachment may be locked in position on the scale.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a fragmentary perspective view of a triangular scale with a drafting attachment, according to this invention, engaged thereon.

Fig. 2 is a fragmentary plan view of Fig. 1.

Fig. 3 is a fragmentary sectional view taken on the line 3—3 of Fig. 2.

Fig. 4 is a perspective view of a protractor in conjunction with which the invention may be used.

Fig. 5 is a sectional view similar to Fig. 3, but illustrating a modification of the invention.

Fig. 6 is a similar view to Fig. 4 showing the drafting attachment in use on a triangular scale and protractor.

Fig. 7 is a side elevational view showing another form of the invention.

Fig. 8 is an end view of Fig. 7.

The drafting attachment for topographical drawing and similar drawing, according to this invention, comprises an equilateral triangularly shaped tubular member 10 adapted to be slipped upon either end portion of an equilateral triangular scale 11. An indication mark in the form of a small aperture 12 is associated with one side arm of the member 10 and is adapted to be aligned with the zero position of any one of the rulings of the scale 11. A vernier means is provided for holding the member 10 in various adjusted positions on the scale and is controlled with a knob 13.

The scale 11 is of standard construction. It is of equilateral triangular shape and on the center line of each of the sides is formed with a longitudinal groove 11ª extending the full length. Along each of the edges of each of the sides the scale is provided with ruled scale markings 11ᵇ.

The tubular member 10 is formed from a strip of metal which is bent into equilateral triangular shape and which has its ends secured together by an inturned end portion 10ª forming part of its bottom arm, engaging over and welded, brazed, soldered or in any other manner securely attached to an extended portion from the adjacent arm. This inturned end portion 10ª is extended from the bottom arm 10ᵇ of the tubular member. This bottom arm is constructed wider than the other arms on one side so that there is a projecting portion 10ᶜ. The aperture 12 is located in portion 10ª, 10ᵇ and 10ᶜ of the bottom arm so that its center point is aligned with the inside edge of the adjacent side arm of member 10 and the adjacent edge of the scale 11 when the end portion of the scale is engaged into the triangular member.

A web member 15 outside of the triangular member 10 is supported by three fingers 15ª which are welded, brazed, soldered or in any other manner securely attached to the inner faces of the arms of the tubular member 10 at areas so as to extend into the grooves 11ª to the inner edges of the arms, but clearing the sides of the grooves when the attachment is engaged upon the end of a scale.

The knob 13 is secured to a shank 16 which is rotative through the web 15. The web 15 has a large opening 17 through which a reduced portion 16ª of the shank passes. Lock friction or plain washers 18 are mounted upon the shank 16ª on opposite sides of the web 15 and serve to frictionally hold the shank 16ª in position on the web. The axis of shank 16ª is concentric with the axis of the scale and its inner portion 16ᵇ is completely threaded and is adapted to threadedly engage either fixed bushing 19 set into both ends of the scale 11 along the axis. The knob 13 is capable of being turned to move the tubular member 10 forward or rearwards and thus "the vernier adjustment". The member 10 should be moved to properly align the opening 12 with the "0" line of the scale to be used as shown in Fig. 2.

In Fig. 4 a protractor 20, to be used in conjunction with tubular member 10, is illustrated. For simple accuracy in drawing, this protractor is a large, light-weight, semi-circular non-metallic sheet with its center located in the middle of the straight edge, i. e. the diameter of the curved edge, which curved edge is lined off in short 15-minute radial lines, the 30-minute lines being a little longer, the degree lines still a little longer, the 5-degree lines still a little longer, and the 10-degree lines a little longer and numbered in two rows; the outer row, preferably marked in red numbers, beginning at "0", at the right end of the diameter and increasing by tens, counterclockwise, to "180" at the left end of the diameter; the inner row, being preferably marked in black numbers, from "360" at the left end of the diameter and decreasing by tens clockwise to "180" at the right end of the diameter. A thin metallic plate 22 with a small area turned over to reinforce the center opening 21, which is exactly the same size as aperture 12, in the scale attachment, and located at the center of the protractor, is fastened to the protractor. The attachment is used by engaging a pintle through the opening 12 and through the opening 21 of the protractor. In this position of the parts the beginning of the rulings on the scale 11 to be used is exactly at the center of the protractor. It is then possible to pivot the scale 11 with or without the protractor angularly about the pintle through opening 21 of the protractor and opening 12 in the scale attachment and distances may be accurately measured off from the center of the protractor 20 along the scale at reference angles or "azimuths", turned clockwise, from a given or sighted point. Detent 30, in Fig. 4 is a short semi-cylindrically shaped metallic member which is securely attached to a thin metallic plate 31. The diameter of the detent is the same as the diameter of the groove 11ª in the scale 11 so as to be capable of fitting snugly therein. The plate 31 is formed with semi-circular extensions on both ends permitting the plate to be riveted to the protractor. A detent 30 is secured by rivets, or the equivalent, to the protractor 20, just inside of the markings on the 360° side of the protractor, with the longitudinal center line of the detent spaced half the width of the side of the scale from, and parallel to, the edge of the protractor 20 so that the bottom groove in scale 11 may be set over the detent, thus keeping the edge of the scale 11 at the edge of protractor 20 while turning it simultaneously with protractor 20 for angles between 180° and 360°. For angles between 0° and 180°, the red numerals on protractor 20, the scale 11 is lifted from detent 30 and swung independently around to place the scale off of the protractor but the edge of the scale, being used, contiguous with the other half of the protractor's edge in which position a pencil point, or other recorder, may be injected between these edges, thereby recording the desired distance at the desired angle.

In Fig. 5 a modification of the invention has been disclosed which distinguishes from the prior form in the provision of a locking element for holding the tubular member locked in various positions on the scale. According to this form of the invention there is a screw 25 which threadedly engages through the shank 16ᵇ. The outer end of the screw 25 has a head 26 by which it may be turned. The inner end 25ª of the screw is adapted to abut against the base of the recess in the bushing 19. In other respects this form of the invention is similar to the previous form. When the screw 25ª abuts against the base of the recess, the shank 16 will be locked against accidental turning.

In Figs. 7 and 8 the member 10 is provided with a spring lock 32, pivoted at 33 in place of the web and vernier attachments. A short pin 34 is welded to the free end of the spring lock 32 and is adapted to pass through a small aperture in the side arm of member 10 and engage in a recess 34' in the scale 11, adapted to hold the small aperture 12 in the bottom arm aligned with the "0" line of the ruling, of the scale being used.

The bottom arm 10ᵇ of member 10 may be made symmetrical about its center line A—A, that is, it would be a separate piece of metal provided with inturned end portions 10ª and projecting portions 10ᶜ with small apertures 12 at both ends, and both side arms having spring locks 32 in place of the web and vernier attachments so as to be able to permit the use of this device on scales with "0" at both ends of each side.

It is to be understood that the size of the triangular scale and of the protractor may vary and the scale and protractor anchor devices may be of any suitable material and shape and used for topographical or similar drawing.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A drafting attachment for topographical and similar drawing, comprising a triangularly shaped tubular member adapted to be slipped upon either end portion of a triangular scale, an indication mark in the form of a small aperture in the bottom arm of said member, adapted to be aligned with the zero mark of any one of the rulings of said scale, and vernier means for holding said member in various adjusted positions on said scale, said tubular member comprising a strip of metallic material bent into triangular shape and having one of its ends extended from the bottom arm with part of the extension bent over and secured to the other end, extended from the adjacent side arm, said bottom arm, and the other part of its extension, being wider than the adjacent side arm, has a projection past the inner edge of the adjacent side arm, to provide material for the indication marking, and said indication marking comprising a small aperture in said projection located so that its center point is aligned with the inside edge of the adjacent side arm and with the adjacent edge of the scale when the end portion of the scale is engaged into the tubular member.

2. A drafting attachment for topographical and similar drawing, comprising a triangularly shaped tubular member adapted to be slipped upon either end portion of a triangular scale, an indication mark in the form of a small aperture in the bottom arm of said member adapted to be aligned with the zero mark of any one of the rulings of said scale, and vernier means for holding said member in various adjusted positions on said scale, said vernier means comprising a web secured to said tubular member, a shank reduced and rotative through said web and having an outer knob by which it may be turned, the inner portion of said shank being threadedly connective with a fixed bushing in either end of said triangular scale.

3. A drafting attachment for topographical and similar drawing, comprising a triangularly shaped tubular member adapted to be slipped upon either end portion of a triangular scale, an indication mark in the form of a small aperture in the bottom arm of said member, adapted to be aligned with the zero mark of any one of the rulings of said scale, and vernier means for holding said member in various adjusted positions on said scale, comprising also a web secured to said tubular member, a shank reduced and rotative through said web and having an outer knob by which it may be turned, the inner portion of said shank being threadedly connective with a fixed bushing in either end of said triangular scale, said bushings to be securely engaged into both ends and along the axis of the triangular scale and each having a threaded opening along its axis for receiving the threaded end of the shank.

4. A drafting attachment for topographical and similar drawing, comprising a triangularly shaped tubular member adapted to be slipped upon either end portion of a triangular scale, an indication mark in the form of a small aperture in the bottom arm of said member adapted to be aligned with the zero mark of any one of the rulings of said scale, and vernier means for holding said member in various adjusted positions on said scale, comprising also a web secured to said tubular member, a shank reduced and rotative through said web and having an outer knob by which it may be turned, the inner portion of said shank being threadedly connective with a fixed bushing in either end of said triangular scale, and washers mounted on said shank and engaging opposite sides of the web for frictionally holding said shank, and spreading the pressure to the three arms.

5. A drafting attachment for topographical and similar drawing, comprising a triangularly shaped tubular member adapted to be slipped upon either end portion of a triangular scale, an indication mark in the form of a small aperture in the bottom arm of said member adapted to be aligned with the zero mark of any one of the rulings of said scale, and vernier means for holding said member in various adjusted positions on said scale, comprising also a web secured to said tubular member, a shank reduced and rotative through said web and having an outer knob by which it may be turned, the inner portion of said shank being threadedly connective with a fixed bushing in either end of said triangular scale, and washers mounted on said shank and engaging opposite sides of the web for frictionally holding said shank and spreading the pressure to the three arms, said web having a slightly larger opening through which the reduced shank passes so as to allow for slight discrepancies in alignment of the axes, and permitting the shank to assume various positions to readily be threadedly engaged into the bushing in either end of said triangular scale in all turned positions of said tubular member on the scale.

6. A drafting attachment for topographical and similar drawing, comprising a triangularly shaped tubular member adapted to be slipped upon either end portion of a triangular scale, an indication mark in the form of a small aperture in the bottom arm of said member adapted to be aligned with the zero mark of any one of the rulings of said scale, and vernier means for holding said member in various adjusted positions on said scale, comprising also a web secured to said tubular member, a shank reduced and rotative through said web and having an outer knob by which it may be turned, the inner portion of said shank being threadedly connective with a fixed bushing in either end of said triangular scale and washers mounted on said shank and engaging opposite sides of the web for frictionally holding said shank and spreading the pressure to the three arms, said web having a slightly larger opening through which the reduced shank passes so as to allow for slight discrepancies in alignment of the axes, and permitting the shank to assume various positions to readily be threadedly engaged into the bushing in either end of said triangular scale in all turned positions of said tubular member on the scale, and a screw threadedly engaged through and on axis of said shank and adapted to abut against the base of the recess in the receptive bushing of said triangular scale to fixedly hold the shank in the correct position, said screw being turned by a small knob secured to the outer end thereof.

7. A device of the class described, comprising a triangularly shaped tubular member adapted to be slipped upon either end portion of a triangular scale, an indication mark in the form of a small aperture in the bottom arm of said member, adapted to be aligned with the zero mark of any of the rulings of said scale, and vernier means for holding said member in various adjusted positions on said scale, said tubular member comprising a strip of metallic material bent into triangular shape and having one of its ends extended from the bottom arm with part of the extension bent over and secured to the other end, extended from the adjacent side arm, said bottom arm, and the other part of its extension, being wider than the adjacent side arm, and having a projection past the inner edge of the adjacent side arm, to provide material for the indication marking, and said indication marking comprising a small aperture in said projection located so that its center point is aligned with the inside edge of the adjacent side arm and with the adjacent edge of the scale when the end portion of the scale is engaged into the tubular member, a protractor with an aperture at its zero position, so arranged that the aperture of the said triangularly shaped member may conveniently be superimposed over the aperture of the protractor.

8. A device of the class described, comprising a triangularly shaped tubular member adapted to be slipped upon either end portion of a triangular scale, an indication mark in the form of a small aperture in the bottom arm of said member, adapted to be aligned with the zero mark of any of the rulings of said scale, and vernier means for holding said member in various adjusted positions on said scale, said tubular member comprising a strip of metallic material bent into triangular shape and having one of its ends extended from the bottom arm with part of the extension bent over and secured to the other end, extended from the adjacent side arm, said bottom arm, and the other part of its extension, being wider than the adjacent side arm, and having a projection past the inner edge of the adjacent side arm, to provide material for the indication marking, and said indication marking comprising a small aperture in said projection located so that its center point is aligned with the inside edge of the adjacent side arm and with the adjacent edge of the scale when the end portion of the scale is engaged into the tubular member, a protractor with an aperture at its zero position, so arranged that the aperture of the said triangularly shaped member may conveniently be superimposed over the aperture of the protractor, a small reinforcing plate secured to the protractor in the vicinity of its zero position, and part of the reinforcing member protruding from the protractor to permit the aperture of the latter to be on the protractor edge.

9. A drafting attachment for conventional triangular scales used in conjunction with a protractor and detents for topographical and similar drawing, comprising a triangularly shaped tubular member adapted to be slipped upon either end portion of a triangular scale, an indication mark in the form of a small aperture in the bottom arm of said member, adapted to be aligned with the zero mark of any of the rulings of said scale, and vernier means for holding said member in various adjusted positions on said scale, said tubular member comprising a strip of metallic material bent into triangular shape and having one of its ends extended from the bottom arm with part of the extension bent over and secured to the other end, extended from the adjacent side arm, said bottom arm, and the other part of its extension, being wider than the adjacent side arm, and having a projection past the inner edge of the adjacent side arm, to provide material for the indication marking, and said indication marking comprising a small aperture in said projection located so that its center point is aligned with the inside edge of the adjacent side arm and with the adjacent edge of the scale when the end portion of the scale is engaged into the tubular member, a protractor with an aperture at its zero position, so arranged that the aperture of the said triangularly shaped member may conveniently be superimposed over the aperture of the protractor, a small reinforcing plate secured to the protractor in the vicinity of its zero position, and part of the reinforcing member protruding from the protractor to permit the aperture of the latter to be on the protractor edge, detents projecting from the vicinity of the straight edge of the protractor said detents being capable of moving the scale when the protractor is turned.

JOHN B. CLERKE.